(12) United States Patent
Chi et al.

(10) Patent No.: US 12,372,740 B2
(45) Date of Patent: Jul. 29, 2025

(54) AUTOMATIC FOCUSING METHOD FOR FLUORESCENCE IMAGING DEVICE

(71) Applicant: Zhuhai Dipu Medical Technology Co., Ltd., Guangdong (CN)

(72) Inventors: Chongwei Chi, Guangdong (CN); Kunshan He, Guangdong (CN)

(73) Assignee: ZHUHAI DIPU MEDICAL TECHNOLOGY CO., LTD., Zhuhai (CN)

( * ) Notice: Subject to any disclaimer, the term of this patent is extended or adjusted under 35 U.S.C. 154(b) by 104 days.

(21) Appl. No.: 18/533,215

(22) Filed: Dec. 8, 2023

(65) Prior Publication Data
US 2025/0076610 A1   Mar. 6, 2025

(30) Foreign Application Priority Data

Aug. 31, 2023  (CN) .......................... 202311117088.0

(51) Int. Cl.
*G02B 7/38*    (2021.01)
*G02B 7/28*    (2021.01)

(52) U.S. Cl.
CPC .............. *G02B 7/38* (2013.01); *G02B 7/282* (2013.01)

(58) Field of Classification Search
CPC ........... G02B 7/38; G02B 7/282; Y02B 20/00
See application file for complete search history.

(56) References Cited

U.S. PATENT DOCUMENTS

| | | | |
|---|---|---|---|
| 2012/0002031 A1* | 1/2012 | Pertsinidis | G02B 21/16 348/79 |
| 2016/0301915 A1* | 10/2016 | Shechtman | G02B 26/06 |
| 2024/0241360 A1* | 7/2024 | Murakami | G02B 21/361 |
| 2024/0281933 A1* | 8/2024 | Chen | G06T 7/11 |
| 2025/0139772 A1* | 5/2025 | Ikeda | G01N 21/64 |

* cited by examiner

*Primary Examiner* — Shahbaz Nazrul

(57) ABSTRACT

The present application provides an automatic focusing method for a fluorescence imaging device, including: S1, obtain a relationship function curve Z-Fv; S2, Gaussian fitting is performed on the relationship function curve Z-Fv, to obtain a standard Gaussian function f(x); S3, the object lens is arranged at three different travel coordinates, to obtain three groups of coordinate-clarity data (Z, Fv); S4, any two groups of the data are taken from the three groups of the coordinate-clarity data (Z, Fv) obtained in S3 and perform the Gaussian fitting with a standard deviation σ, to obtain a Gaussian function $f_1(x)$; and S5, an average value $\mu_1$ of the Gaussian function $f_1(x)$ is calculated, as a preferred travel coordinate Z' for this time of the focusing object lens. The present application solves problems of large focusing clarity error and slow focusing speed of the fluorescence imaging device in existing technologies.

8 Claims, 2 Drawing Sheets

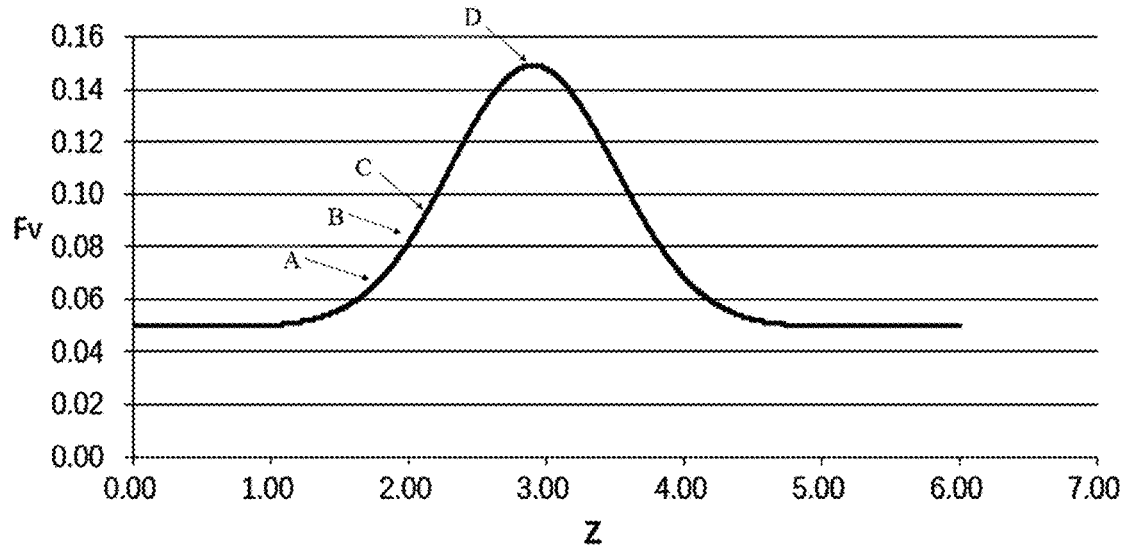

Fig. 2

S01, converting two-dimensional matrix data of the image into a one-dimensional array tmp, sorting the one-dimensional array tmp, and acquiring a median value med of the one-dimensional array tmp S02, for each pixel point in a two-dimensional matrix of the image, performing the following operations: dividing a pixel value of an existing pixel point by the median value med and normalizing, to obtain a normalized median value; taking a difference value between the normalized median value of the existing pixel point and a pixel value of another nearby pixel point; and using a square of the difference value as a result value res of the existing pixel point; and S03, accumulatively adding the result value res of each pixel point in the two-dimensional matrix of the image, and squaring an accumulatively added sum, to obtain the image clarity evaluation value Fv

Fig. 3

AUTOMATIC FOCUSING METHOD FOR FLUORESCENCE IMAGING DEVICE

CROSS-REFERENCE TO RELATED APPLICATIONS

This application claims priority to Chinese Patent Application No. 202311117088.0, filed on Aug. 31, 2023, which are incorporated herein by reference in their entirety.

TECHNICAL FIELD

The present application relates to the field of medical imaging devices, in particular to an automatic focusing method for a fluorescence imaging device.

BACKGROUND

At present, optical fluorescence imaging devices are increasingly and widely used in surgical operations. The optical fluorescence imaging device generally uses a mode of camera and lens to obtain images, and this inevitably encounters a defocusing situation of a target field of view.

On the premise without additionally arranging a focusing system, there are three traditional solution schemes for the focusing problem, which are shown as follows.

The first scheme is to use a combination of deep-field lens and aperture to guarantee that images that meet the quality requirements may be acquired within a certain range, and images that exceed the range require a manual movement of a collection device to guarantee the image clarity. This scheme is complex in operation, the imaging quality is not high, and the error is relatively large.

The second scheme is to control a combination of motor and object lens, manually control the motor to move the object lens, and simultaneously collect images in real time. The image clarity is judged by human eyes, to achieve clear focusing within a relatively wide range. This scheme heavily relies on human subjective sensation, the clarity error is large, and the focusing speed is relatively slow.

The third scheme is to use a software focusing mode based on the second scheme. The motor is automatically controlled by software to drive the object lens for a full travel movement, and the image clarity is calculated by an algorithm, the process of human eye focusing is simulated, and the clearest focal plane is judged by the software. Compared with the manual focusing in the second scheme, this scheme has a faster and more accurate focusing speed. However, it still requires a considerable amount of time and requires no significant image changes (such as a brightness change and a jitter) in the focusing process, thus it have relatively large limitations.

In conclusion, the focusing methods for the fluorescence imaging devices in existing technologies generally have the problems such as the large focusing clarity error and the slow focusing speed.

SUMMARY

A purpose of the present application is to provide an automatic focusing method for a fluorescence imaging device in response to the above defects in the existing technologies, as to solve problems of large focusing clarity error and slow focusing speed in the fluorescence imaging device.

In order to solve the above problems, the present application adopts the following technical schemes.

An automatic focusing method for a fluorescence imaging device, including the following steps:

S1, under a white light condition, when an object lens is in different travel coordinates Z, an image clarity evaluation value Fv of an image collected by a camera is acquired, and then a relationship function curve Z-Fv between the object lens travel coordinate Z and the image clarity evaluation value Fv is acquired;

S2, it is calculated to obtain an average value $\mu$ and a standard deviation $\sigma$ of the relationship function curve Z-Fv, and Gaussian fitting is further performed on the relationship function curve Z-Fv obtained in S1, to obtain a standard Gaussian function f(x) under existing hardware conditions;

S3, under the white light condition, the object lens is arranged at three different travel coordinates, the camera is used to collect images at the three travel coordinates, and the corresponding image clarity evaluation value Fv is calculated separately, to obtain three groups of coordinate-clarity data (Z, Fv);

S4, any two groups of the data are taken from the three groups of the coordinate-clarity data (Z, Fv) obtained in S3 and the Gaussian fitting is performed with the standard deviation $\sigma$, to obtain three groups of Gaussian function data, and one group with the smallest fitting error is selected as final data, to obtain a Gaussian function $f_1(x)$ corresponding to this time of focusing; and S5, an average value $\mu_1$ of the Gaussian function $f_1(x)$ is calculated, and the average value $\mu_1$ is used as a preferred travel coordinate Z' for this time of the focusing object lens.

Further, the S1 specifically includes:

under the white light condition, the object lens is controlled to move step by step within the travel range by a motor, when one step is moved at a time, the camera is used to collect an existing image, and the corresponding image clarity evaluation value Fv is calculated, and then the existing travel coordinate Z of the object lens and the corresponding image clarity evaluation value Fv are recorded; and after all travel coordinates Z are traversed, the image clarity evaluation values Fv of all images are normalized, and then it corresponds to each travel coordinate Z of the object lens, to obtain the complete relationship function curve Z-Fv.

Further, a calculation method for the image clarity evaluation value Fv is as follows:

S01, two-dimensional matrix data of the image is converted into a one-dimensional array tmp, the one-dimensional array tmp is sorted, and a median value med of the one-dimensional array tmp is acquired;

S02, for each pixel point in a two-dimensional matrix of the image, the following operations are performed: a pixel value of an existing pixel point is divided by the median value med and normalized, to obtain a normalized median value; a difference value between the normalized median value of the existing pixel point and a pixel value of another nearby pixel point is taken; and a square of the difference value is used as a result value res of the existing pixel point; and S03, the result value res of each pixel point in the two-dimensional matrix of the image is accumulatively added, and an accumulatively added sum is squared, to obtain the image clarity evaluation value Fv.

Further, in S02, another pixel point near the pixel point is: another pixel point in an X-axis direction separated by one pixel point from the pixel point.

Further, when the image clarity evaluation value Fv is calculated, if the image is a black and white image, it is directly calculated; and if the image is a color image, it is converted into the black and white image and then calculated.

Further, when the image clarity evaluation value Fv is calculated, a partial area of the image is selected as a target for calculation, as to improve the calculation speed.

Further, the automatic focusing method for the fluorescence imaging device further includes the following steps:

S6, under the white light condition, the object lens is moved to the preferred travel coordinate Z' of the object lens, and the existing image is collected by the camera, to confirm whether the image clarity evaluation value Fv of the existing image is lower than a set standard value; if the image clarity evaluation value Fv of the existing image is lower than the set standard value, it is returned to S3 and executed again sequentially;

S7, white light is turned off, and according to a focal plane difference between a white light focal plane and a fluorescence focal plane of the fluorescence imaging device, the object lens is moved to a final position; and S8, this time of focusing is ended, and a clear fluorescence image is collected under a fluorescence condition.

Further, data results in S1 and S2 are stored and recorded, and when re-focusing is required, if existing hardware conditions remain unchanged, Steps S1 and S2 are skipped, and it is executed directly from S3.

The automatic focusing method for the fluorescence imaging device provided by the present application may quickly obtain the most preferred focal plane position by using a limited number of points according to the relationship between the travel coordinates of the object lens and the clarity of the collected images, thereby the fast automatic focusing of the fluorescence imaging device is achieved. Compared with the existing technologies, the automatic focusing method of the present application requires less movement and acquisition of points, greatly improves the anti-interference capability, and greatly improves the efficiency and accuracy of automatic focusing; and the problems of large focusing clarity error and slow focusing speed in the fluorescence imaging device in the existing technologies are solved.

BRIEF DESCRIPTION OF THE DRAWINGS

FIG. 2 is a process schematic diagram of Steps S3 to S5 in an embodiment of the present application.

FIG. 3 is a calculation method for the image clarity evaluation value Fv.

DETAILED DESCRIPTION OF THE EMBODIMENTS

Figure 1:
FIG. 1 is a flow schematic diagram of an automatic focusing method for a fluorescence imaging device provided in an embodiment of the present application.

Technical schemes of the present application are described in detail below in combination with drawings and specific embodiments.

As shown in FIG. 1, an embodiment of the present application provides an automatic focusing method for a fluorescence imaging device, including the following steps:

S1, under a white light condition, when an object lens is in different travel coordinates Z, an image clarity evaluation value Fv of an image collected by a camera is acquired, and then a relationship function curve Z-Fv between the object lens travel coordinate Z and the image clarity evaluation value Fv is acquired.

The specific process of the S1 includes: under the white light condition, the object lens is controlled to move step by step from a farthest end to a nearest end within the travel range by a motor, when one step is moved at a time, the camera is used to collect an existing image, and the corresponding image clarity evaluation value Fv is calculated, and then the existing travel coordinate Z of the object lens and the corresponding image clarity evaluation value Fv are recorded; and after all travel coordinates Z are traversed, the image clarity evaluation values Fv of all images are normalized, and then it corresponds to each travel coordinate Z of the object lens, to obtain the complete relationship function curve Z-Fv.

In this embodiment, the motor may be a stepping motor with an encoder or other closed-loop control components that may feed back existing coordinate positions, herein the stepping accuracy of a single step movement is within 0.05 mm, and the object lens travel range under its control is 0-6 mm.

S2, it is calculated to obtain an average value μ and a standard deviation σ of the relationship function curve Z-Fv, and Gaussian fitting is further performed on the relationship function curve Z-Fv obtained in S1 by using a least square method, to obtain a standard Gaussian function f(x) under existing hardware conditions. Herein, a calculation formula for the standard Gaussian function f(x) is as follows:

$$f(x) = \frac{1}{\sqrt{2\pi}\sigma}\exp\left(-\frac{(x-\mu)^2}{2\sigma^2}\right)$$

It should be noted that after Steps S1 and S2 are completed, related data may be saved for subsequent reuse. For single hardware, Steps S1 and S2 only need to be executed once. In the case that the hardware conditions remain unchanged, the software and hardware restart or reboot does not need to be executed again. When re-focusing is required again, by reading the data saved previously, Steps S1 and S2 may be directly skipped, and it is executed directly from Step S3.

S3, under the white light condition, the object lens is arranged at three different travel coordinates close to each other by the motor, such as points A, B, and C shown in FIG. 2, the camera is used to collect images at the three travel coordinates, and the corresponding image clarity evaluation value Fv is calculated separately, to obtain three groups of coordinate-clarity data (Z, Fv).

S4, any two groups of the data are taken from the three groups of the coordinate-clarity data (Z, Fv) obtained in S3 and the Gaussian fitting is performed with the standard deviation σ, to obtain three groups of Gaussian function data totally by fitting according to three different combination situations, and one group with the smallest fitting error is selected from the three groups of the Gaussian function data as final data, to obtain a Gaussian function $f_1(x)$ corresponding to this time of focusing.

S5, an average value $\mu_1$ of the Gaussian function $f_1(x)$ corresponding to this time of focusing is calculated, and the average value $\mu_1$ is used as a preferred travel coordinate Z' of the object lens corresponding to the focal plane calculated for this time of focusing, namely a point D shown in FIG. 2.

S6, under the white light condition, the object lens is moved to the preferred travel coordinate Z' of the object lens by the motor, and the existing image is collected by the camera, to confirm whether the image clarity evaluation value Fv of the existing image is lower than a set standard value; and in this embodiment, the standard value adopted is 0.14. If the image clarity evaluation value Fv of the existing image is lower than the set standard value, it is returned to S3 and executed again sequentially.

S7, white light is turned off, and according to a focal plane difference between a white light focal plane and a fluorescence focal plane of the fluorescence imaging device, the object lens is moved to a final position by the motor. Herein, the focal plane difference between the white light focal plane and the fluorescence focal plane is a fixed value for the fluorescence imaging device, this value reflects a difference in focal plane distance of the fluorescence imaging device under white light and fluorescence conditions and may be measured in advance by mature existing technical means.

S8, this time of focusing is ended, and a clear fluorescence image is collected under the fluorescence condition.

As shown in FIG. 3, in the embodiment of the present application, a calculation method for the image clarity evaluation value Fv is as follows:

S01, two-dimensional matrix data of the image is converted into a one-dimensional array tmp, the one-dimensional array tmp is sorted, and a median value med of the one-dimensional array tmp is acquired;

S02, for each pixel point in a two-dimensional matrix of the image, the following operations are performed: a pixel value of an existing pixel point is divided by the median value med and normalized, to obtain a normalized median value; a difference value between the normalized median value of the existing pixel point and a pixel value of another nearby pixel point is taken; and a square of the difference value is used as a result value res of the existing pixel point. Herein, the another nearby pixel point is: another pixel point in an X-axis direction separated by one pixel point from the pixel point.

S03, the result value res of each pixel point in the two-dimensional matrix of the image is accumulatively added, and an accumulatively added sum is squared, to obtain the image clarity evaluation value Fv.

As an improvement, when the image clarity evaluation value Fv is calculated, if the image is a black and white image, it is directly calculated; and if the image is a color image, it is converted into the black and white image and then calculated. In addition, a partial area of the image may also be selected as a target for calculation, as to improve the calculation speed.

In the calculation method for the image clarity evaluation value Fv provided in the embodiment of the present application, normalization processing is performed before the pixel differences are accumulatively added, and it is squared again after the accumulation is completed, the difference in clarity calculation results caused by the different brightness is greatly reduced, and the image clarity may be evaluated more scientifically and accurately.

In the embodiment of the present application, fast focusing is achieved by using the motor to move "three small steps" and "one big step"; herein, the "three small steps" correspond to the three different travel coordinates for data collection in Step S3. According to the fitting calculation result, by the "one big step" in Step S5, the object lens is directly moved to the preferred travel coordinate with the best image clarity. Finally, the image clarity of the preferred travel coordinate is confirmed by Step S6, to ensure the validity of the automatic focusing result.

According to engineering experiences, the average consuming time required for a single movement of the motor is 50 ms, and the average consuming time required for camera triggered photography is 10 ms. A great majority of the focusing processes in the embodiments of the present application may smoothly find focal points in the process of "three small steps"+"one big step"+"clear confirmation", and its theoretical consuming time is 50*3+10*4+150+20=360 ms. According to actual testing, the average consuming time spent on 1000 times of automatic focusing in the embodiments of the present application is 401 ms, and the frequency of the consuming time less than 0.5 s accounts for 98%, and the focusing clarity values are all above 0.14.

The automatic focusing method for the fluorescence imaging device provided by the present application may quickly obtain the most preferred focal plane position by using a limited number of points according to the relationship between the travel coordinates of the object lens and the clarity of the collected images, thereby the fast automatic focusing of the fluorescence imaging device is achieved. Compared with the existing technologies, the automatic focusing method of the present application requires less movement and acquisition of points, greatly improves the anti-interference capability, and greatly improves the efficiency and accuracy of automatic focusing; and the problems of large focusing clarity error and slow focusing speed in the fluorescence imaging device in the existing technologies are solved.

The above embodiments only express a plurality of implementation modes of the present application, and its descriptions are more specific and detailed, but may not be understood as limiting the scope of the present application. It should be pointed out that for those of ordinary skill in the art, a plurality of deformations and improvements may also be made without departing from the concept of the present application, all of which shall fall within the scope of protection of the present application. Therefore, the scope of protection of the present application should be based on the appended claims.

What is claimed is:

1. An automatic focusing method for a fluorescence imaging device, characterized by comprising the following steps:

S1, under a white light condition, when an object lens is in different travel coordinates Z, acquiring an image clarity evaluation value Fv of an image collected by a camera, and then acquiring a relationship function curve Z-Fv between the object lens travel coordinate Z and the image clarity evaluation value Fv;

S2, calculating to obtain an average value μ and a standard deviation σ of the relationship function curve Z-Fv, and further performing Gaussian fitting on the relationship function curve Z-Fv obtained in S1, to obtain a standard Gaussian function f(x) under existing hardware conditions;

S3, under the white light condition, arranging the object lens at three different travel coordinates, using the camera to collect images at the three travel coordinates, and calculating the corresponding image clarity evaluation value Fv separately, to obtain three groups of coordinate-clarity data (Z, Fv);

S4, taking any two groups of the data from the three groups of the coordinate-clarity data (Z, Fv) obtained in S3 and performing the Gaussian fitting with the standard deviation σ, to obtain three groups of Gaussian function data, and selecting one group with the smallest fitting error as final data, to obtain a Gaussian function $f_1(x)$ corresponding to this time of focusing; and S5, calculating an average value $\mu_1$ of the Gaussian function $f_1(x)$, and using the average value $\mu_1$ as a preferred travel coordinate Z' for this time of the focusing object lens.

2. The automatic focusing method for the fluorescence imaging device according to claim 1, characterized in that the S1 specifically comprises:

under the white light condition, controlling the object lens to move step by step within the travel range by a motor; when moving one step at a time, using the camera to collect an existing image, and calculating the corresponding image clarity evaluation value Fv, and then recording the existing travel coordinate Z of the object lens and the corresponding image clarity evaluation value Fv; and after traversing all travel coordinates Z, normalizing the image clarity evaluation values Fv of all images, and then corresponding to each travel coordinate Z of the object lens, to obtain the complete relationship function curve Z-Fv.

3. The automatic focusing method for the fluorescence imaging device according to claim 1, characterized in that a calculation method for the image clarity evaluation value Fv is as follows:

S01, converting two-dimensional matrix data of the image into a one-dimensional array tmp, sorting the one-dimensional array tmp, and acquiring a median value med of the one-dimensional array tmp;

S02, for each pixel point in a two-dimensional matrix of the image, performing the following operations: dividing a pixel value of an existing pixel point by the median value med and normalizing, to obtain a normalized median value; taking a difference value between the normalized median value of the existing pixel point and a pixel value of another nearby pixel point; and using a square of the difference value as a result value res of the existing pixel point; and S03, accumulatively adding the result value res of each pixel point in the two-dimensional matrix of the image, and squaring an accumulatively added sum, to obtain the image clarity evaluation value Fv.

4. The automatic focusing method for the fluorescence imaging device according to claim 3, characterized in that in S02, another pixel point near the pixel point is: another pixel point in an X-axis direction separated by one pixel point from the pixel point.

5. The automatic focusing method for the fluorescence imaging device according to claim 3, characterized in that when calculating the image clarity evaluation value Fv, if the image is a black and white image, it is directly calculated; and if the image is a color image, it is converted into the black and white image and then calculated.

6. The automatic focusing method for the fluorescence imaging device according to claim 3, characterized in that when calculating the image clarity evaluation value Fv, a partial area of the image is selected as a target for calculation, as to improve the calculation speed.

7. The automatic focusing method for the fluorescence imaging device according to claim 3, characterized by further comprising the following steps:

S6, under the white light condition, moving the object lens to the preferred travel coordinate Z of the object lens, and collecting the existing image by the camera, to confirm whether the image clarity evaluation value Fv of the existing image is lower than a set standard value; if the image clarity evaluation value Fv of the existing image is lower than the set standard value, returning to S3 and executing again sequentially;

S7, turning off white light, and according to a focal plane difference between a white light focal plane and a fluorescence focal plane of the fluorescence imaging device, moving the object lens to a final position; and S8, ending this time of focusing, and collecting a clear fluorescence image under a fluorescence condition.

8. The automatic focusing method for the fluorescence imaging device according to claim 7, characterized in that data results in S1 and S2 are stored and recorded, and when re-focusing is required, if existing hardware conditions remain unchanged, Steps S1 and S2 are skipped, and it is executed directly from S3.

* * * * *